(No Model.)
V. E. KEEGAN.
DYNAMO ELECTRIC MACHINE.
No. 275,392. Patented Apr. 10, 1883.
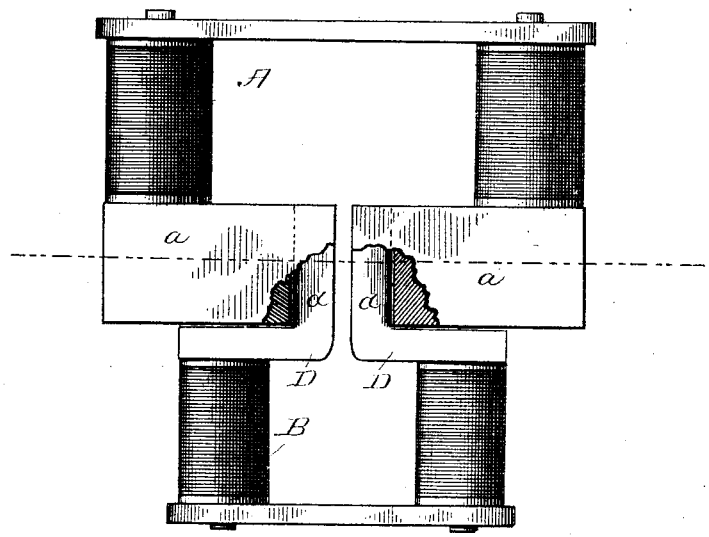
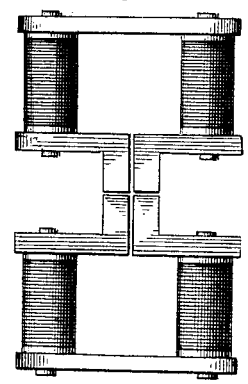
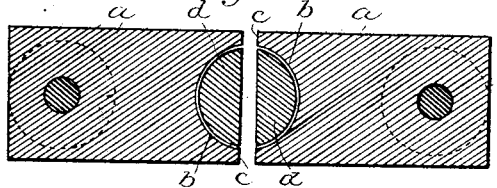
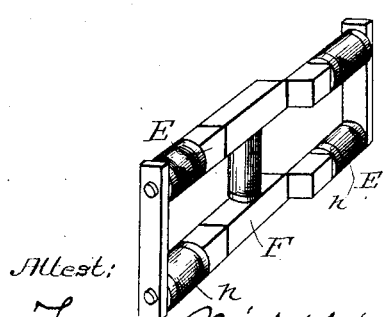
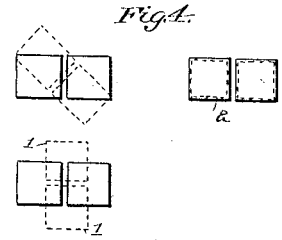
Attest:
Frank Middleton
David H. Mead
Inventor:
Vincent E. Keegan
by Elij Spear
Atty.

UNITED STATES PATENT OFFICE.

VINCENT E. KEEGAN, OF BOSTON, MASSACHUSETTS.

DYNAMO-ELECTRIC MACHINE.

SPECIFICATION forming part of Letters Patent No. 275,392, dated April 10, 1883.

Application filed June 9, 1882. (No model.)

*To all whom it may concern:*

Be it known that I, VINCENT ELIJA KEEGAN, of Boston, in the county of Suffolk and State of Massachusetts, have invented a new and useful Improvement in Dynamo-Electric Machines; and I do hereby declare that the following is a full, clear, and exact description of the same.

My invention relates to dynamo-electric machines, but is also applicable to electric motors.

The object of my invention is, first, to reduce the amount of power required to work a dynamo-electric machine for the generation of an electric current by changing the polarity of the instant poles at time of motion without any disruptive discharge; and, second, to avoid the production of secondary induced currents in the wire coil of the induced and inducing magnet.

My invention consists, first, in the relatively close arrangement of the poles of the magnet, both of the stationary and moving, whereby the poles of the moving magnet at the instant of motion from position of maximum polarity begin to pass before the opposite pole of the stationary or inducing magnet, thus causing opposite inductions to neutralize the existing induced magnetism of opposite polarity in the poles, and thus allowing motion with great freedom from magnetic attraction.

The second part of my invention consists in a special construction of the poles of the magnets, both inducing and induced, whereby the poles of one are made to revolve between and in close proximity to the poles of the other, and the magnetic force is exerted more nearly in line parallel to motion of rotation.

In the accompanying drawings I have illustrated the best mode known to me for carrying out my invention.

In the drawings, Figure 1 represents in plan a form adapted either to a dynamo-electric machine or to an electric motor. Fig. 2 is a transverse section on line $x$ $x$ of Fig. 1. Fig. 3 is a modification in plan, and Fig. 4 represents a face view of the poles of the magnets shown in Fig. 3. Fig. 5 shows another modification in perspective.

In the drawings, A represents the stationary or inducing magnet, which may be an electro-magnet or a permanent steel magnet. The general form of it is that of an ordinary horse-shoe-magnet, but the poles are formed of extension-pieces $a$ $a$, which are turned toward each other at right angles to the arms of the magnet. The ends of these extension-pieces are formed with hollowed faces, the hollows or depressions in the opposite faces forming, when the pieces are in position, a cylindrical cavity extending quite across the faces. Those parts of the faces not cut away and opposite each other are separated by the space ordinarily of from one-eighth to one-fourth of an inch; but this space may be increased in very large machines. The space must be greatly less than the length of the face of the moving pole, so that said moving pole will begin to move before the face of one pole of the fixed magnet as soon as it begins to leave the face of the other. The hollowed faces are shown at $b$, and the plain opposing faces at $c$.

The induced magnet, which in the form shown is intended as the revolving magnet, is represented at B. Except in the form of the poles, it may be of ordinary shape. The poles are shown at $d$ $d$. They are formed upon the ends of extension-pieces D D, fixed to the cores of the induced magnet, said poles being bent at right angles to said extension-pieces. They are in form longitudinal segments of cylinders, each less than a half-cylinder, with a space between the parts equal to the space between the plain faces of the magnet A, heretofore described. The parts and spaces are so proportioned that the two poles form practically a cylindrical body, which, when the magnets are set into their proper positions, occupies the cylindrical space between the poles of the magnet A, fitting as closely to the hollowed ends as it may practically without touching at any point. Ordinarily the annular space between the periphery of the poles $d$ $d$ and the walls of the cavity of the poles of magnet A will be equal in width to that of a thick sheet of paper.

The induced magnet B is provided with an ordinary coil of insulated wire, with connections which may be made in the usual manner, and need not be herein described. The induced magnet may be mounted on an axis in any convenient or well-known manner, so that it may be rotated at right angles to the cores. This rotation will cause the poles *d d* to revolve in the cavity between the poles of the inducing-magnet A.

In an apparatus of the proportions hereinbefore described the cylindrical extension formed by the poles *d d* will be approximately seven-eighths of an inch. It will be apparent that when the poles are in the position shown in Fig. 2—that is to say, with the poles *d d* each exactly opposite a pole of the inducing-magnet—each will be acted upon by the inducing-poles to their full extent—that is to say, the said poles *d d* are then in a position of maximum polarity; but as in their motion of rotation they begin to pass from this position before the faces of the inducing-magnet of opposite polarity, they begin to receive inductions of a polarity the opposite of that previously received, which latter induction tends to neutralize the former at that point in the revolution where the poles of the induced magnet are before or overlap equal parts of each pole; or at one-fourth revolution from the position first specified the inductions of opposite polarity are in equilibrium, and from this point to the position of a half-revolution the opposing induction prevails. This construction therefore prevents any disruptive discharge of the poles in their motion before the face of the static stationary magnet, and gives motion, free to a greater extent, from retarding magnetic attraction. No depolarization occurs at any point or instant, but only successive changes of opposite polarization.

Instead of the hollowed poles of the stationary and the cylindrical poles of the moving or induced magnets, I may use poles with plain opposing faces, as shown in Figs. 3 and 4, though not ordinarily with as good effect. In this case the spaces between the poles of each magnet must be of such small dimension, as compared with the area of the faces of the said poles, that each pole of the moving magnet shall, immediately upon its movement from position of maximum polarity, begin to pass before the face of the opposite pole of the inducing-magnet. These positions I have illustrated by dotted lines in Fig. 4, where the full lines show the position of maximum polarity, dotted lines 1 1 a position one-fourth turned and in equilibrium, and lines 2 show the moving poles one-half turned, or in position of reversed polarity of induction.

The first form shown with cylindrical poles is of special advantage for use in an electric motor, for the reason that the magnetic attraction between the poles of the inducing and those of the induced magnet is more nearly in the direct line of motion than in the form and arrangement of the poles in the ordinary motors.

In the modification shown in Fig. 5 the principle of my invention is shown in connection with a vibrating armature. In this I use two inducing-magnets, E E, set in different planes. Between them is the armature or induced magnet F, of such thickness in the face of its poles that as it reciprocates from the plane of one magnet to that of the other it shall begin to pass before one immediately upon beginning to move from its position before the other. This form is not here intended, as shown, for an electric motor, but as illustrating the manner in which the principle shown in the revolving apparatus heretofore described, with plain opposed faces, may be applied in this form for purposes of a dynamo-electric machine.

The position of the coil of the induced magnet is shown at *h h*. As this is entirely removed from the field-magnet at such distance that the said magnet cannot act directly on the coils, but only through the inducing-magnet, no disturbing secondary currents can occur in the coils caused by such direct induction, and, as I have found, there is greatly less tendency in the machine to heat.

It is also to be understood that a helix or solenoid may be used as an armature for induction in place of soft iron. This solenoid must be constructed to act on same principle as the induced acting magnet or armature.

I am aware that it is not new to arrange the pole of the armature so that its face shall begin to pass in front of the face of the stationary or field magnet before leaving the face of a preceding magnet; but

I claim—

1. In a dynamo-electric machine, an inducing-magnet having its poles in close position in relation to the width of its faces, in combination with an induced magnet having like poles and faces, whereby the moving magnet, at the instant of motion from position of maximum polarity, begins to pass in front of the opposite pole of the stationary magnet, and alternate successive changes of polarity are induced in the poles of the induced magnet without disruptive discharge of its polarity, as set forth.

2. The combination of the inducing-magnet A, having cylindrically-hollowed faces placed near to and opposite each other, and the induced magnet B, having suitable coils and connections, and poles *d d*, located within the cavity formed by the hollowed poles of magnet A, substantially as described.

In testimony whereof I have signed my name to this specification in the presence of two subscribing witnesses.

VINCENT ELIJA KEEGAN.

Witnesses:
FRANK L. MIDDLETON,
DAVID H. MEAD.